(12) United States Patent  
Shu et al.

(10) Patent No.: US 12,204,208 B2
(45) Date of Patent: Jan. 21, 2025

(54) DISPLAY PANEL AND DISPLAY APPARATUS

(71) Applicant: BOE Technology Group Co., Ltd., Beijing (CN)

(72) Inventors: Shi Shu, Beijing (CN); Xiang Li, Beijing (CN); Wei Li, Beijing (CN); Yong Yu, Beijing (CN); Shaohui Li, Beijing (CN); Qi Yao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/017,550

(22) PCT Filed: Feb. 23, 2022

(86) PCT No.: PCT/CN2022/077446
§ 371 (c)(1),
(2) Date: Jan. 23, 2023

(87) PCT Pub. No.: WO2023/159383
PCT Pub. Date: Aug. 31, 2023

(65) Prior Publication Data
US 2024/0264490 A1 Aug. 8, 2024

(51) Int. Cl.
G02F 1/13357 (2006.01)
G02F 1/1334 (2006.01)
(Continued)

(52) U.S. Cl.
CPC .... *G02F 1/133617* (2013.01); *G02F 1/13345* (2021.01); *G02F 1/133603* (2013.01);
(Continued)

(58) Field of Classification Search
CPC .......... G02F 1/133617; G02F 1/13345; G02F 1/133603; G02F 1/133788
See application file for complete search history.

(56) References Cited

U.S. PATENT DOCUMENTS 9,946,108 B2 4/2018 Yu
2018/0011370 A1 1/2018 Yu
2019/0129257 A1* 5/2019 Wang ................ G02F 1/134309

FOREIGN PATENT DOCUMENTS

CN 105511175 A 4/2016
CN 110596919 A 12/2019

* cited by examiner

*Primary Examiner* — Lucy P Chien
(74) *Attorney, Agent, or Firm* — WHDA, LLP

(57) ABSTRACT

The present disclosure provides a display panel, including: a first base substrate; a color conversion layer; a light-emitting device layer; and a liquid crystal layer. The liquid crystal layer includes a first optical path adjustment portion and a second optical path adjustment portion spaced apart from each other. Orthographic projections of the first optical path adjustment portion and a light-emitting device on the first base substrate at least partially overlaps with each other, and orthographic projections of the second optical path adjustment portion and the light-emitting device on the first base substrate are spaced apart from each other. In response to the second optical path adjustment portion being in a first state, in light emitted by the light-emitting device, light incident to the second optical path adjustment portion through the first optical path adjustment portion is refracted, or is scattered for at least once.

19 Claims, 11 Drawing Sheets

(51) Int. Cl.
   *G02F 1/1337*  (2006.01)
   *G02F 1/1343*  (2006.01)
   *G02F 1/1345*  (2006.01)
   *G02F 1/1368*  (2006.01)
(52) U.S. Cl.
   CPC .. *G02F 1/133788* (2013.01); *G02F 1/134309* (2013.01); *G02F 1/13452* (2013.01); *G02F 1/1368* (2013.01); *G02F 2202/36* (2013.01)

DISPLAY PANEL AND DISPLAY APPARATUS

CROSS-REFERENCE TO RELATED APPLICATION

This application is a Section 371 National Stage Application of International Application No. PCT/CN2022/077446, filed on Feb. 23, 2022, entitled "DISPLAY PANEL AND DISPLAY APPARATUS", incorporated herein by reference in its entirety.

TECHNICAL FIELD

The present disclosure relates to a field of display technology, and in particular, to a display panel and a display apparatus.

BACKGROUND

Micro light-emitting diode (Micro LED) has advantages of long service life, high reliability, high color purity, modularity, customizability, repairability, and the like, and is a display technology that is most likely to replace the organic light-emitting diode (OLED) technology in the future.

At present, the micro LED technology has challenges including a light emission uniformity of chips, a yield of mass transfer, etc. in its development. In a foreseeable future, the above problems are important problems that will affect the development of the micro LED technology for a long time. In addition to efforts in areas such as a uniformity of epitaxy, color conversion technology is also a way to effectively ameliorate the above problems. The color conversion technology uses a color conversion layer arranged on a light output side of a micro diode to conduct photoluminescence, so as to realize a color conversion function. In this way, micro LEDs of only one color may be provided in a display panel, thereby reducing a micro LED dependence of a display panel manufacturer, especially a dependence on red micro LEDs with a complex process, a great technical difficulty and a poor yield. Moreover, the color conversion technology may simplify the original three times of mass transfers (for red micro LED, blue micro LED, and green micro LED) to once, greatly reducing a yield loss and a repair workload caused by the mass transfers.

However, in a display panel using the color conversion technology, there is a large distance between the micro LEDs and the color conversion layers, causing a color crosstalk problem, thereby affecting a display effect.

SUMMARY

In view of the above-mentioned problems, the present disclosure provides a display panel and a display apparatus.

According to a first aspect of the present disclosure, there is provided a display panel, including:
a first base substrate;
a color conversion layer arranged on the first base substrate;
a light-emitting device layer arranged between the first base substrate and the color conversion layer; and
a liquid crystal layer arranged between the light-emitting device layer and the color conversion layer,
where the light-emitting device layer includes a light-emitting device, the liquid crystal layer includes a first optical path adjustment portion and a second optical path adjustment portion spaced apart from each other, where an orthographic projection of the first optical path adjustment portion on the first base substrate at least partially overlaps with an orthographic projection of the light-emitting device on the first base substrate, and an orthographic projection of the second optical path adjustment portion on the first base substrate is spaced apart from the orthographic projection of the light-emitting device on the first base substrate; and
where the second optical path adjustment portion has at least a first state; and in response to the second optical path adjustment portion being in the first state, in light emitted by the light-emitting device, light incident to the second optical path adjustment portion through the first optical path adjustment portion is refracted so as to narrow a light output angle of the light-emitting device, or is scattered for at least once.

According to embodiments of the present disclosure, the display panel further includes:
a first driving component arranged on the first base substrate,
where the second optical path adjustment portion has the first state and a second state, and the second optical path adjustment portion is configured to switch between the first state and the second state in response to an electric field applied by the first driving component; in response to the second optical path adjustment portion being in the first state, a refractive index of the second optical path adjustment portion is less than a refractive index of the first optical path adjustment portion, so that the light incident to the second optical path adjustment portion from the first optical path adjustment portion is refracted; and in response to the second optical path adjustment portion being in the second state, the refractive index of the second optical path adjustment portion is substantially equal to the refractive index of the first optical path adjustment portion.

According to embodiments of the present disclosure, an orthographic projection of the first driving component on the first base substrate is spaced apart from the orthographic projection of the first optical path adjustment portion on the first base substrate.

According to embodiments of the present disclosure, the display panel further includes:
a first electrode layer arranged on a side of the liquid crystal layer proximate to the first base substrate; and
a second electrode layer arranged on a side of the liquid crystal layer away from the first base substrate,
where the first driving component includes a first electrode located in the first electrode layer and a second electrode located in the second electrode layer.

According to embodiments of the present disclosure, the display panel further includes a pixel circuit layer arranged between the light-emitting device layer and the first base substrate; and
the pixel circuit layer includes a first thin film transistor, and a first terminal of the light-emitting device is electrically connected with a first electrode of the first thin film transistor through a first connection electrode, where the first connection electrode and the first electrode are arranged in a same layer and made of a same material.

According to embodiments of the present disclosure, the second electrode of the first driving component is electrically connected with a first voltage terminal, and the first electrode of the first driving component is electrically connected with a second terminal of the light-emitting device and a second voltage terminal; or
the second electrode of the first driving component is electrically connected with the first voltage terminal, and the first electrode of the first driving component is electrically connected with the first terminal of the light-emitting device.

According to embodiments of the present disclosure, the display panel further includes a third electrode layer arranged on a side of the liquid crystal layer proximate to the first base substrate, the first driving component includes a third electrode in the third electrode layer, and the third electrode includes a first sub electrode and a second sub electrode spaced apart from each other,
where the first driving component is configured to generate the electric field in response to a first electric signal provided to the first sub electrode and a second electric signal provided to the second sub electrode.

According to embodiments of the present disclosure, an electrical signal provided to the first driving component includes an AC signal.

According to embodiments of the present disclosure, a liquid crystal in the second optical path adjustment portion includes a first liquid crystal and a second liquid crystal, and the second liquid crystal is obtained by irradiating a photo-polymer liquid crystal material with ultraviolet light under a preset electric field,
where the second liquid crystal is configured to keep a long axis of the first liquid crystal in a preset direction, so that the second optical path adjustment portion is remained in the first state at all times.

According to embodiments of the present disclosure, the display panel further includes:
a second driving component arranged on the first base substrate,
where each of a liquid crystal in the first optical path adjustment portion and a liquid crystal in the second optical path adjustment portion includes a third liquid crystal, the first optical path adjustment portion has a third state and a fourth state, and the first optical path adjustment portion is configured to switch between the third state and the fourth state in response to an electric field applied by the second driving component; and
where in response to the first optical path adjustment portion being in the third state and the second optical path adjustment portion being in the first state, the third liquid crystal in the first optical path adjustment portion is in an ordered arrangement, and the third liquid crystal in the second optical path adjustment portion is in a disordered arrangement, so that the light incident to the second optical path adjustment portion from the first optical path adjustment portion is scattered; in response to the first optical path adjustment portion being in the fourth state and the second optical path adjustment portion being in the first state, the third liquid crystal in the second optical path adjustment portion and the third liquid crystal in the first optical path adjustment portion are in a disordered arrangement.

According to embodiments of the present disclosure, the display panel further includes a fourth electrode layer arranged on a side of the liquid crystal layer away from the first base substrate and a pixel circuit layer arranged between the light-emitting device layer and the first base substrate; the second driving component includes a fourth electrode in the fourth electrode layer, and the fourth electrode is electrically connected with a third voltage terminal,
where the pixel circuit layer includes a first thin film transistor, a first terminal of the light-emitting device is electrically connected with the first thin film transistor, and a second terminal of the light-emitting device is electrically connected with a fourth voltage terminal; and
where the second driving component is configured to: generate an electric field in response to a voltage difference between the fourth electrode and the first terminal of the light-emitting device, or to generate an electric field in response to a voltage difference between the fourth electrode and the second terminal of the light-emitting device.

According to embodiments of the present disclosure, the third liquid crystal includes at least one of a polymer dispersed liquid crystal or a liquid crystal of an interpenetrating polymer network type.

According to embodiments of the present disclosure, the display panel further includes:
a dam layer arranged on the first base substrate,
where the color conversion layer includes a plurality of quantum dots of different colors, and the dam layer includes a dam spacing the plurality of quantum dots from each other; and
where the second optical path adjustment portion is configured such that the light incident to the second optical path adjustment portion from the first optical path adjustment portion is emitted towards the dam in response to the second optical path adjustment portion being in the first state.

According to embodiments of the present disclosure, the display panel further includes a first driving component arranged on the first base substrate;
where the second optical path adjustment portion has the first state and a second state, and the second optical path adjustment portion is configured to switch between the first state and the second state in response to an electric field applied by the first driving component; in response to the second optical path adjustment portion being in the first state, a refractive index of the second optical path adjustment portion is less than a refractive index of the first optical path adjustment portion, so that the light incident to the second optical path adjustment portion from the first optical path adjustment portion is refracted; and in response to the second optical path adjustment portion being in the second state, the refractive index of the second optical path adjustment portion is substantially equal to the refractive index of the first optical path adjustment portion; and
in response to the second optical path adjustment portion being in the second state, at least part of the light incident to the second optical path adjustment portion from the first optical path adjustment portion is emitted toward at least one of the quantum dots.

According to embodiments of the present disclosure, the dam includes a reflective material, and the display panel further includes:
a light absorption layer arranged on a side of the dam layer proximate to the first base substrate,
where the light absorption layer includes a light absorption portion, and an orthographic projection of the light absorption portion on the first base substrate at least partially overlaps with an orthographic projection of the dam on the first base substrate.

According to embodiments of the present disclosure, the light absorption portion includes a plurality of color resists stacked in a thickness direction of the display panel, where different color resists have different colors; or the light absorption portion includes a black matrix.

According to embodiments of the present disclosure, the light-emitting device includes a micro light-emitting diode.

According to embodiments of the present disclosure, the display panel further includes a first alignment layer arranged on a side of the liquid crystal layer proximate to the first base substrate and a second alignment layer arranged on a side of the liquid crystal layer away from the first base substrate; the first alignment layer and the second alignment layer have a same alignment angle; or the liquid crystal in the liquid crystal layer includes a self-oriented liquid crystal material.

According to embodiments of the present disclosure, the display panel further includes a spacer layer between the color conversion layer and the first base substrate; and the spacer layer includes a spacer, and an orthographic projection of the spacer on the first base substrate is spaced apart from the orthographic projection of the first optical path adjustment portion on the first base substrate.

A second aspect of the present disclosure provides a display apparatus, including the display panel described above.

BRIEF DESCRIPTION OF THE DRAWINGS

The above contents and other objectives, features and advantages of the present disclosure will become more apparent through the following description of embodiments of the present disclosure with reference to the accompanying drawings.

DETAILED DESCRIPTION OF EMBODIMENTS

Figure 1:
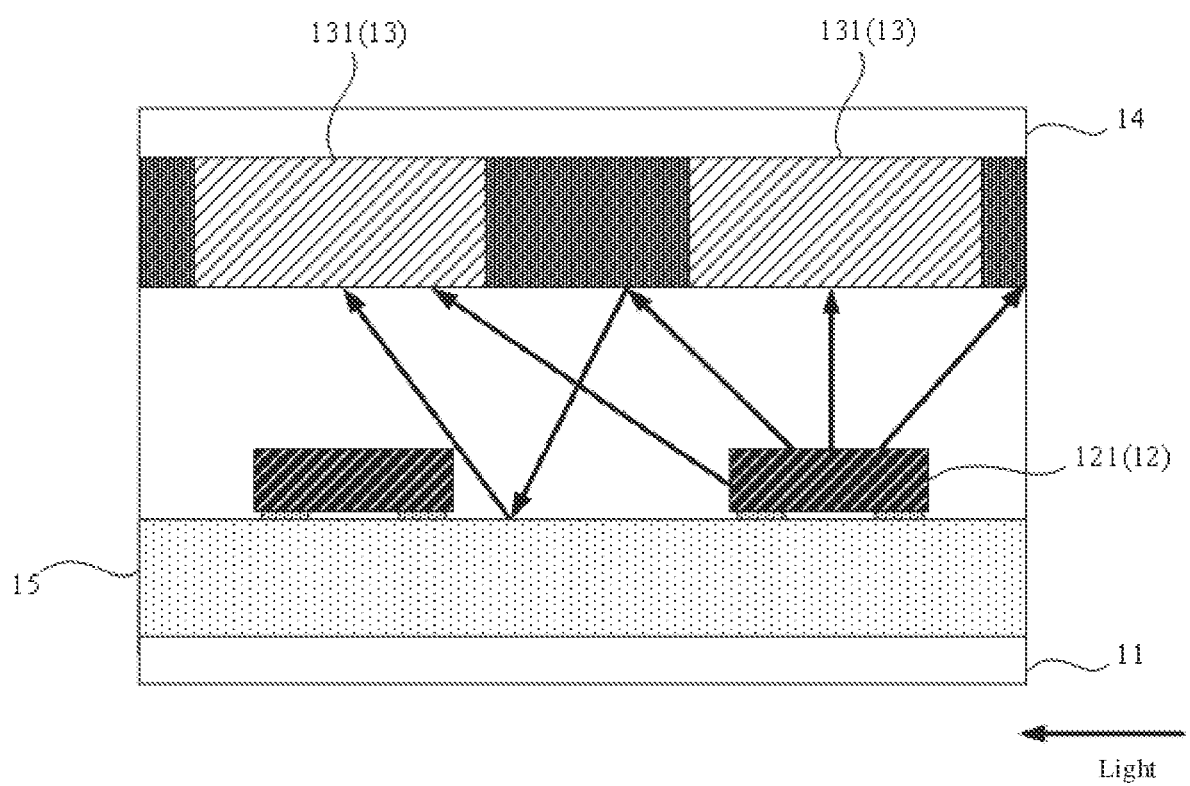
FIG. 1 schematically shows a schematic diagram of a display panel in a comparison example.

In order to make the objectives, technical solutions and advantages of embodiments of the present disclosure more apparent, the technical solutions in embodiments of the present disclosure will be described clearly and wholly with reference to the accompanying drawings. It is obvious that embodiments described are only some of the embodiments of the present disclosure, rather than all the embodiments. All other embodiments, which may be derived by those of ordinary skill in the art from embodiments in the present disclosure without carrying out inventive effort, fall within the scope of the present disclosure.

It should be noted that in the accompanying drawings, a size and relative size of elements may be enlarged for clarity and/or description. As such, the sizes and relative sizes of various elements are not necessarily limited to those shown in the figures. In the description and the drawings, the same or similar reference signs denote the same or similar components.

When an element is described as being "on", "connected to" or "coupled to" another element, the element may be directly on, connected to or coupled to the other element or an intervening element may be present. However, when an element is described as being "directly on", "directly connected to" or "directly coupled to" another element, there is no intervening element. Other terms and/or expressions used to describe a relationship between elements should be interpreted in a similar manner, such as, "between . . . and . . . " versus "directly between . . . and . . . ", "adjacent" versus "directly adjacent" or "on" versus "directly on", etc. Moreover, a term "connection" may refer to a physical connection, an electrical connection, a communication connection, and/or a fluid connection. Furthermore, X, Y, and Z axes are not limited to three axes of a rectangular coordinate system, and may be interpreted in a broader sense. For example, the X, Y, and Z axes may be perpendicular to each other, or may represent different directions that are not perpendicular to each other. For the present disclosure, "at least one of X, Y, or Z" and "at least one selected from a group consisting of X, Y, and Z" may be interpreted as X only, Y only, Z only, or any combination of two or more of X, Y and Z, such as XYZ, XYY, YZ and ZZ. As used herein, a term "and/or" includes any and all combinations of one or more of related items listed.

It should be noted that, although the terms "first", "second", etc. may be used herein to describe various components, members, elements, regions, layers and/or portions, these components, members, elements, regions, layers and/or portions should not be limited by these terms. Rather, these terms are used to distinguish one component, member, element, region, layer or portion from another. Thus, for example, a first component, a first member, a first element, a first region, a first layer, and/or a first portion discussed below could be termed a second component, a second member, a second element, a second region, a second layer, and/or a second portion without departing from teachings of the present disclosure.

For ease of description, spatial relationship terms, such as "upper", "lower", "left", "right", and the like, may be used herein to describe a relationship between one element or feature and another element or feature as illustrated in the figures. It will be understood that the spatial relationship terms are intended to encompass different orientations of a device in use or operation in addition to an orientation depicted in the figures. For example, if the device in the figures is turned over, an element described as "below" or "beneath" another element or feature would then be oriented "above" or "over" the other element or feature.

Those skilled in the art should understand that, unless otherwise specified, the expression "thickness" refers to a dimension perpendicular to surfaces of respective film layers arranged in a display panel, i.e., a dimension along a light-exiting direction of the display panel.

Herein, unless otherwise specified, the expression "patterning process" generally includes steps of photoresist coating, exposure, development, etching, photoresist stripping, and the like. The expression "a patterning process"

means a process of forming a patterned layer, component, member or the like using one mask.

It should be noted that the expression "a same layer", "arranged in a same layer" or a similar expression refers to a layer structure formed by forming a film layer for forming a specific pattern by using the same film formation process and then patterning the film layer through a patterning process using the same mask. Depending on a specific pattern, a patterning process may include a plurality of exposure, development, or etching processes, and the specific pattern in the formed layer structure may be continuous or discontinuous. The specific pattern may also be at different heights or have different thicknesses.

Herein, unless otherwise stated, the expression "electrically connected" may mean that two components or elements are directly electrically connected, for example, a component or element A is in direct contact with a component or element B, and an electrical signal may be transmitted between the two. The expression also may mean that two components or elements are electrically connected through a conductive medium such as a conductive wire, for example, a component or element A is electrically connected to a component or element B through a conductive wire to transmit an electrical signal between the two components or elements. The expression may also mean that two components or elements are electrically connected through at least one electronic element, for example, a component or element A is electrically connected to a component or element B through at least one thin film transistor to transmit an electrical signal between the two components or elements.

FIG. 1 schematically shows a schematic diagram of a display panel in a comparation example. As shown in FIG. 1, in the component example, the display panel adopts the color conversion technology. Specifically, the display panel includes a first base substrate 11, a light-emitting device layer 12 located on the first base substrate 11, a color conversion layer 13 located on a side of the light-emitting device layer 12 away from the first base substrate 11, a second base substrate 14 located on a side of the color conversion layer 13 away from the first base substrate 11, a pixel circuit layer 15 between the light-emitting device layer 12 and the first base substrate 11, and the like. The light-emitting device layer 12 may include a plurality of light-emitting devices 121, and the light-emitting devices 121 may include electroluminescent devices, such as micro light-emitting diodes (Micro LEDs) or the like. The color conversion layer 13 includes a plurality of quantum dots 131. Optionally, the quantum dots 131 are arranged in one-to-one correspondence with the light-emitting devices 121. The quantum dot 131 includes a photoluminescent material capable of wavelength conversion. Light emitted by a light-emitting device 121 may be converted into a desired color after passing through a corresponding quantum dot 131, thereby realizing a color conversion function.

The inventors find in the research that, in a process of manufacturing a display panel, the light-emitting device layer 12 is generally first formed on the first base substrate 11 and the color conversion layer 13 is formed on the second base substrate 14. Then, the first base substrate 11 with the light-emitting device layer 12 formed thereon and the second base substrate 14 with the color conversion layer 13 formed thereon are subjected to processes such as a cell alignment process to combine the two, so as to obtain the display panel. In the above-mentioned process, in order to ensure that the light-emitting devices 121 in the light-emitting device layer 12 will not be damaged by external forces, it is necessary to leave a certain buffer space on a side of the light-emitting device layer 12 away from the first base substrate 11, so that there is a certain distance between the light-emitting device layer 12 and the color conversion layer 13 in the prepared display panel. For example, with continued reference to FIG. 1, it is supposed that the left quantum dot 131 is a green quantum dot, and the right quantum dot 131 is a red quantum dot, when a red image needs to be displayed, a light-emitting device 121 below the red quantum dot emits light. Since there is a certain distance between the light-emitting device layer 12 and the color conversion layer 13, a part of the light emitted by the right light-emitting device 121 may travels to the left green quantum dot, and a color crosstalk phenomenon occurs, affecting the display effect.

Figure 2:
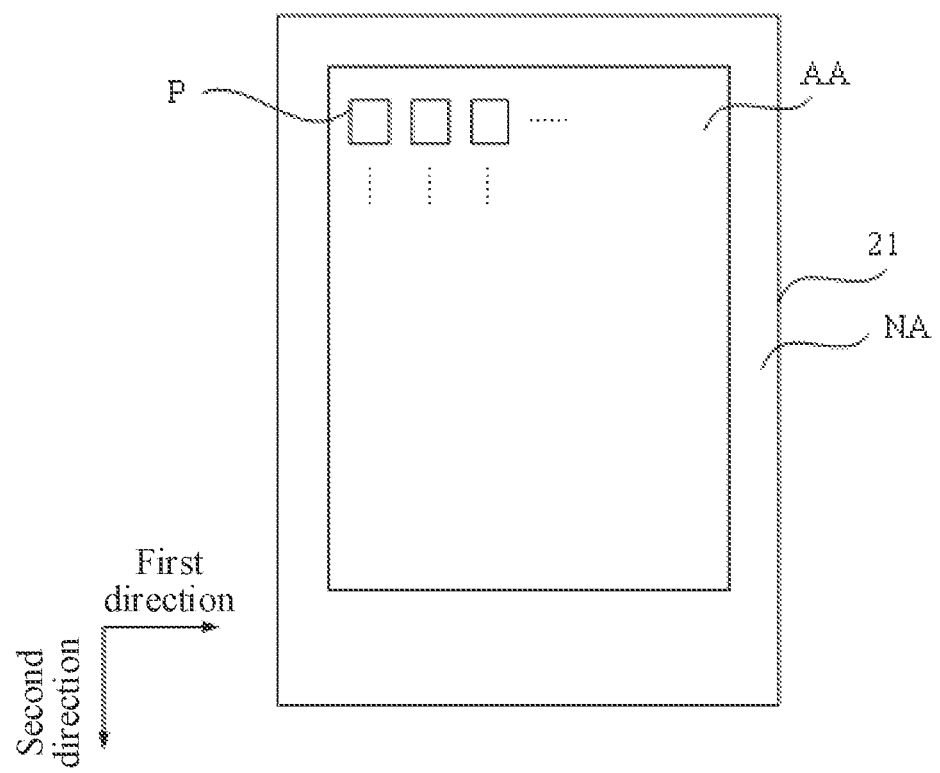
FIG. 2 schematically shows a plan view of a display panel in an embodiment of the present disclosure.
Figure 3:
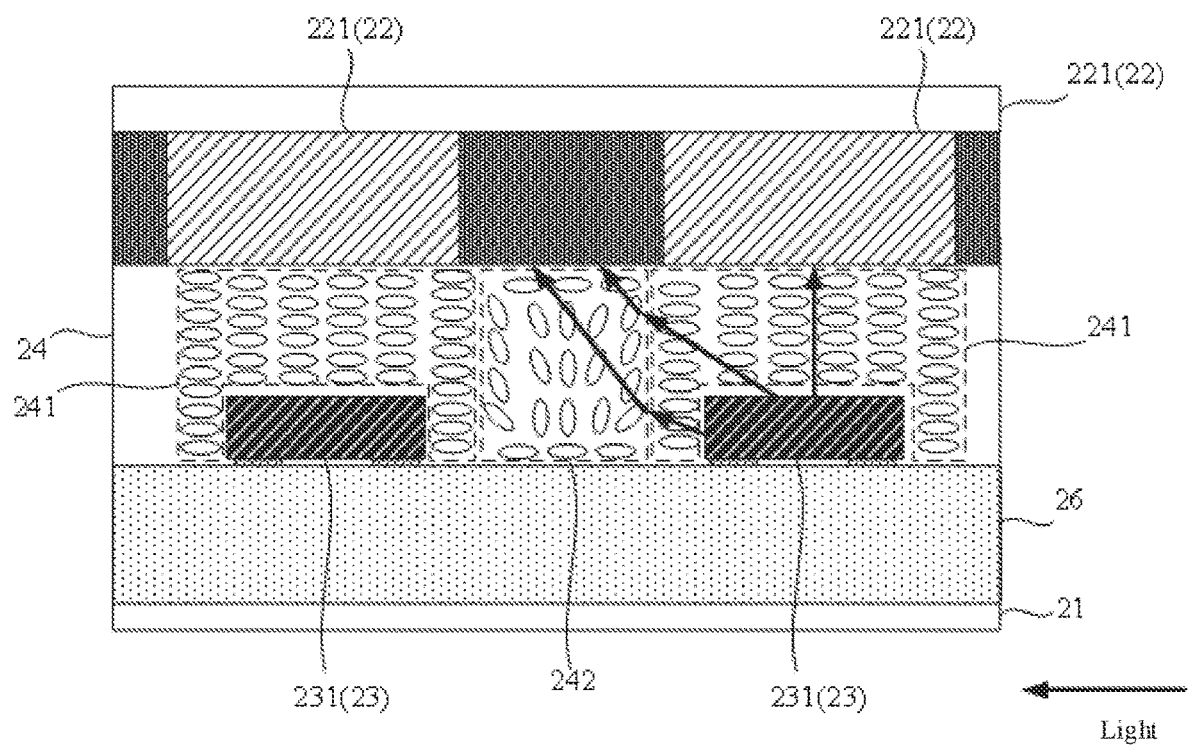
FIG. 3 schematically shows a first sectional view in a display area in an embodiment of the present disclosure.

In view of the above, embodiments of the present disclosure provide a display panel. FIG. 2 schematically shows a plan view of a display panel in an embodiment of the present disclosure. As shown in FIG. 2, the display panel in embodiments of the present disclosure may have a display area AA, and a non-display area NA outside the display area AA. The display area AA is provided with a plurality of pixel units P arranged in an array along a first direction and a second direction, where the first direction may include a row direction of the display panel, i.e., a horizontal direction in FIG. 2, and the second direction may include a column direction of the display panel, i.e., a vertical direction in FIG. 2. Each pixel unit P may include a plurality of sub pixels, and each sub pixel may include a light-emitting device to be mentioned below. FIG. 3 schematically shows a first sectional view in a display area in an embodiment of the present disclosure. As shown in FIG. 2 and FIG. 3, in the embodiments of the present disclosure, the display panel includes: a first base substrate 21, and a color conversion layer 22, a light-emitting device layer 23 and a liquid crystal layer 24 which are arranged on the first base substrate 21. The light-emitting device layer 23 is arranged between the first base substrate 21 and the color conversion layer 22, and the liquid crystal layer 24 is arranged between the light-emitting device layer 23 and the color conversion layer 22.

In the embodiments of the present disclosure, the light-emitting device layer 23 includes a light-emitting device 231. Optionally, the light-emitting device layer 23 includes a plurality of light-emitting devices 231, and the light-emitting devices 231 may include an electroluminescent device. For example, the light-emitting devices 231 may include an organic light-emitting diode (OLED) or a Micro LED. Optionally, the light-emitting devices 231 including the Micro LED is taken as an example in describing the display panel in the embodiments of the present disclosure below.

The display panel further includes a pixel circuit layer 26 arranged on a side of the light-emitting device layer 23 proximate to the first base substrate 21. The pixel circuit layer 26 includes a plurality of pixel circuits (not shown). At least one pixel circuit corresponds to one light-emitting device 231 and electrically connected to the light-emitting device 231. For example, the pixel circuits are in one-to-one correspondence with the light-emitting devices 231 and electrically connected to the light-emitting devices 231. The display panel further includes a gate driver circuit, a data driver chip (not shown), and the like that are arranged on the first base substrate 21 and located in the non-display area NA. The gate driver circuit and the data driver chip may be electrically connected with the plurality of pixel circuits through corresponding gate lines and data lines, so as to drive a light-emitting device 231 corresponding to each pixel circuit to emit light through the pixel circuit.

The liquid crystal layer 24 includes a first optical path adjustment portion 241 and a second optical path adjustment portion 242 spaced apart from each other, where an orthographic projection of the first optical path adjustment portion 241 on the first base substrate 21 at least partially overlaps with an orthographic projection of the light-emitting device 231 on the first base substrate 21, and an orthographic projection of the second optical path adjustment portion 242 on the first base substrate 21 is spaced apart from the orthographic projection of the light-emitting device 231 on the first base substrate 21.

In an embodiment of the present disclosure, the light-emitting device layer 23 may include a plurality of light-emitting devices 231, and different light-emitting devices 231 have different colors. For example, the plurality of light-emitting devices 231 may include a red light-emitting device, a green light-emitting device, and a blue light-emitting device. The liquid crystal layer 24 may include a plurality of first optical path adjustment portions 241 and a plurality of second optical path adjustment portions 242. At least one light-emitting device 231 may be arranged corresponding to at least one first optical path adjustment portion 241, and the first optical path adjustment portions 241 corresponding to different light-emitting devices 231 are different. For example, the light-emitting device 231 may be arranged in one-to-one correspondence with the first optical path adjustment portion 241. Optionally, an orthographic projection of at least one first optical path adjustment portion 241 on the first base substrate 21 may at least partially overlaps with an orthographic projection of a light-emitting device 231 corresponding to the at least one first optical path adjustment portion 241 on the first base substrate 21, so that when the light-emitting device 231 emits light, the light emitted by the light-emitting device 231 may exit after passing through the first optical path adjustment portion 241.

Optionally, the liquid crystal layer 24 may include a plurality of second optical path adjustment portions 242, and a second optical path adjustment portion 242 may be arranged between two first optical path adjustment portions 241 adjacent in the first direction; or a second optical path adjustment portion 242 may be arranged between two first optical path adjustment portions 241 adjacent in the second direction; or a second optical path adjustment portion 242 is arranged between two first optical path adjustment portions 241 adjacent in the first direction, and another second optical path adjustment portion 242 is also arranged between two first optical path adjustment portions 241 adjacent in the second direction.

With reference to FIG. 3, the two first optical path adjustment portions 241 adjacent in the first direction and the second optical path adjustment portion 242 between the two first optical path adjustment portions 241 are taken as an example in explaining an operation principle of the first optical path adjustment portion 241 and the second optical path adjustment portion 242 in embodiments of the present disclosure below.

In an embodiment of the present disclosure, the second optical path adjustment portion 242 has at least a first state. When the second optical path adjustment portion 242 is in the first state, in light emitted by the light-emitting device 231, light incident to the second optical path adjustment portion 242 through the first optical path adjustment portion 241 is refracted so as to narrow a light-emitting angle of the light-emitting device 231, or is scattered for at least once. Taking the light incident to the second optical path adjustment portion 242 through the first optical path adjustment portion 241 being refracted as an example, when a pure color picture is displayed, such as a red picture, a green picture, a blue picture, for any light-emitting device 231 in FIG. 3, when the light emitted by the light-emitting device 231 is incident to the second optical path adjustment portion 242 through the first optical path adjustment portion 241, since the light travels from an optically denser medium to an optically thinner medium, light with an oblique incident angle will be refracted, and a refraction angle is greater than the incident angle, so that a light output angle of the light-emitting device 231 may be narrowed, thereby improving a color crosstalk problem caused by the light emitted by the light-emitting device 231 incident to another quantum dot 221, and a color purity of the pure color picture is improved. For example, for the right light-emitting device 231 in FIG. 3, after the light emitted by the right light-emitting device 231 is narrowed by the second optical path adjustment portion 242, light capable of reaching the left quantum dot 221 may be greatly reduced.

It should be noted that when the liquid crystal in the second optical path adjustment portion 242 is in a disorder arrangement, and the liquid crystal in the first optical path adjustment portion 241 is in an ordered arrangement, the light incident to the second optical path adjustment portion 242 from the first optical path adjustment portion 241 may be scattered, and an intensity of the light is reduced at each time the scattering occurs. For the light emitted by the right light-emitting device 231 in FIG. 3, when the light incident to the second optical path adjustment portion 242 from the first optical path adjustment portion 241 is scattered for one or a plurality of times, it is difficult for this part of light to pass through the second optical path adjustment portion 242, which may also improve the color crosstalk problem. Specific descriptions for this configuration will be made in detail below, and will not be repeated here.

It should be noted that in embodiments of the present disclosure, a pure color picture may refer to all or part of an image displayed on the display panel. For example, the pure color picture may refer to a picture displayed by one or more pixel units P. Each pixel unit P may include a plurality of sub pixels. Sub pixels in a same pixel unit P have different colors. For example, the plurality of sub pixels include a red sub pixel, a green sub pixel, and a blue sub pixel. The term "pure color" may refer to a color of one of sub pixels in a pixel unit P. For example, the pure color may include red, green, and blue.

In the embodiments of the present disclosure, the light incident to the second optical path adjustment portion 242 from the first optical path adjustment portion 241 may be refracted or scattered. The following description will take the example that the light incident to the second optical path adjustment portion 242 from the first optical path adjustment portion 241 is refracted in an embodiment of the present disclosure, in combination with FIG. 2 to FIG. 9.

Figure 4:
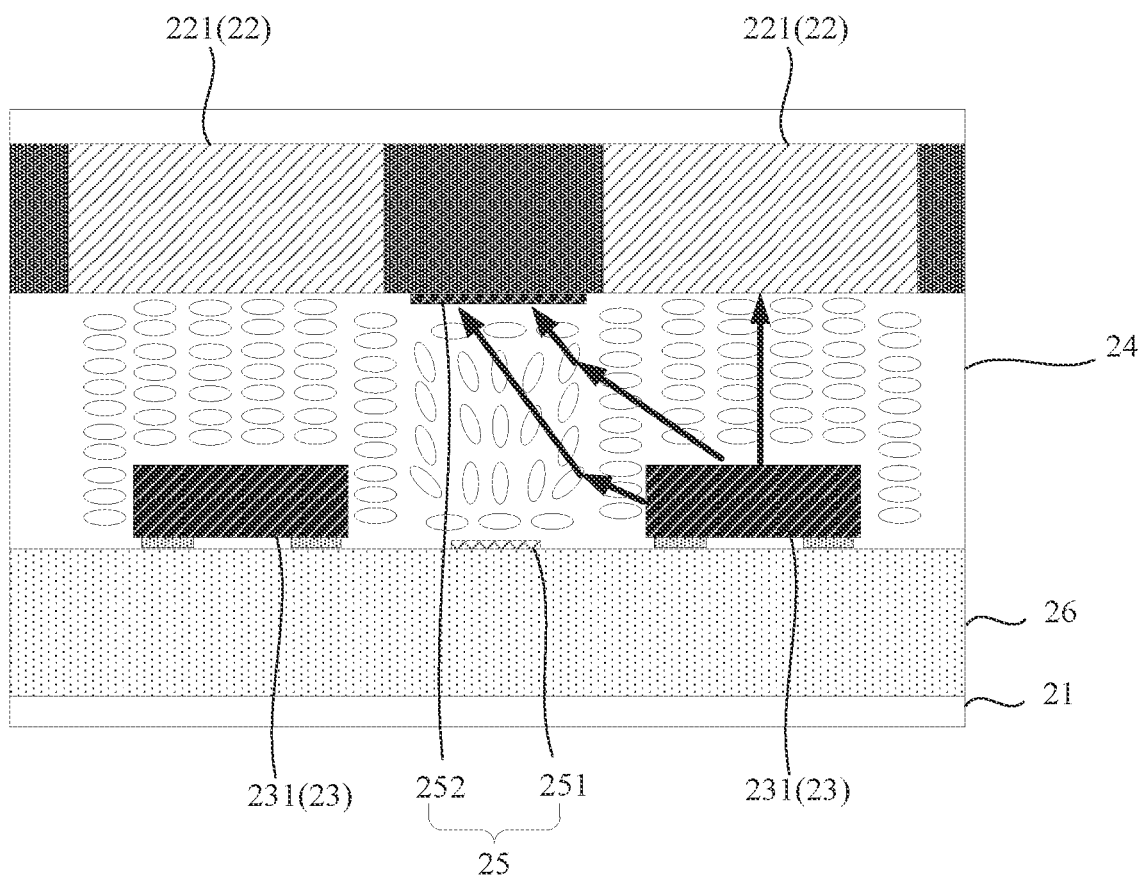
FIG. 4 and FIG. 5 schematically show schematic diagrams of a second optical path adjustment portion switching between a first state and a second state in an embodiment of the present disclosure.
Figure 5:
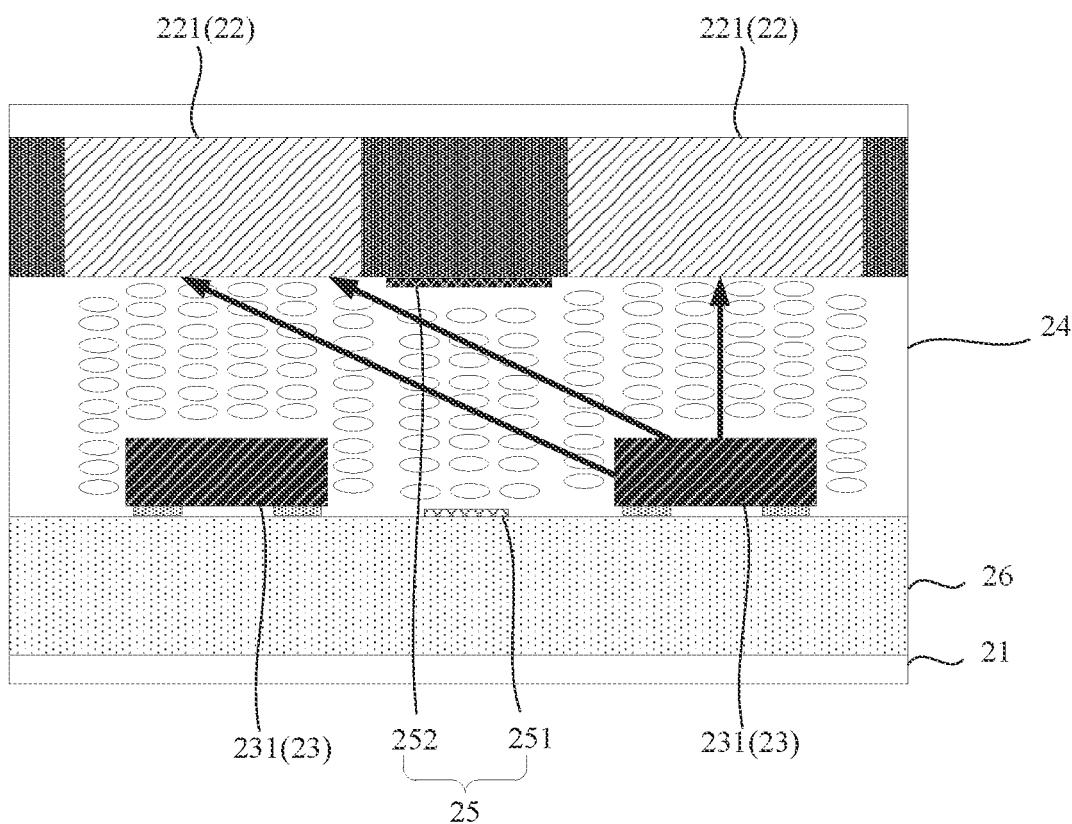

FIG. 4 and FIG. 5 schematically show schematic diagrams of a second optical path adjustment portion switching between a first state and a second state in an embodiment of the present disclosure. In FIG. 4, the second optical path adjustment portion is in the first state, and in FIG. 5, the second optical path adjustment portion is in the second state. As shown in FIG. 4 and FIG. 5, in some specific embodiments, the display panel further includes a first driving component 25, and the second optical path adjustment portion 242 is configured to switch between the first state and the second state in response to an electric field applied by the first driving component 25.

Optionally, the display panel includes a plurality of first driving components 25. At least one first driving component 25 is arranged corresponding to one second optical path adjustment portion 242. Second optical path adjustment portions 242 corresponding to different first driving components 25 are different. For example, the first driving components 25 may be in one-to-one correspondence with the second optical path adjustment portions 242. The second optical path adjustment portion 242 may be configured to switch between the first state and the second state in response to the electric field applied by the first driving component 25 corresponding to the second optical path adjustment portion 242.

Optionally, at least one first driving component 25 may include two plate-like electrodes located on two opposite sides of the liquid crystal layer 24, or at least one first driving component 25 may include a slit electrode located on a side of the liquid crystal layer 24, which will be described in detail below, and will not be described here.

For a pure color picture, such as a red picture, a green picture, and a blue picture, when the second optical path adjustment portion 242 is in the first state, a refractive index of the second optical path adjustment portion 242 is less than a refractive index of the first optical path adjustment portion 241, so that the light incident to the second optical path adjustment portion from the first optical path adjustment portion is refracted. In this case, the light output angle of the light-emitting device 231 may be narrowed to improve the color crosstalk problem, thereby improving the color purity of the pure color picture. For a mixed color picture, such as a yellow picture, a cyan picture, a magenta picture, a white picture, and the like, the second optical path adjustment portion 242 may be set to be in the second state. In the embodiments of the present disclosure, when the second optical path adjustment portion 242 is in the second state, the refractive index of the second optical path adjustment portion 242 is substantially equal to the refractive index of the first optical path adjustment portion 241. In this case, the light output angle of the light-emitting device 231 remains unchanged, and for the two light-emitting devices 231 in FIG. 5, light emitted by the left light-emitting device 231 may be incident to the right quantum dot 221 in addition to being incident to the quantum dot 221 above the left light-emitting device 231. Similarly, the light emitted by the right light-emitting device 231 may be incident to the left quantum dot 221 in addition to being incident to the quantum dot 221 above the right light-emitting device 231. In this way, the intensity of the light incident to each quantum dot 221 becomes larger, so that a display brightness may be improved, and thus a display power consumption may be reduced.

It should be noted that in embodiments of the present disclosure, the mixed color picture may refer to all or part of an image displayed on the display panel. For example, the mixed color picture may refer to a picture displayed by one or more pixel units. As mentioned above, the "pure color" may refer to the color of one of the sub-pixels of a pixel unit, and accordingly, a mixed color may refer to a color formed by mixing colors of a plurality of sub-pixels in a pixel unit, such as yellow, cyan, magenta, white, and the like.

Figure 6:
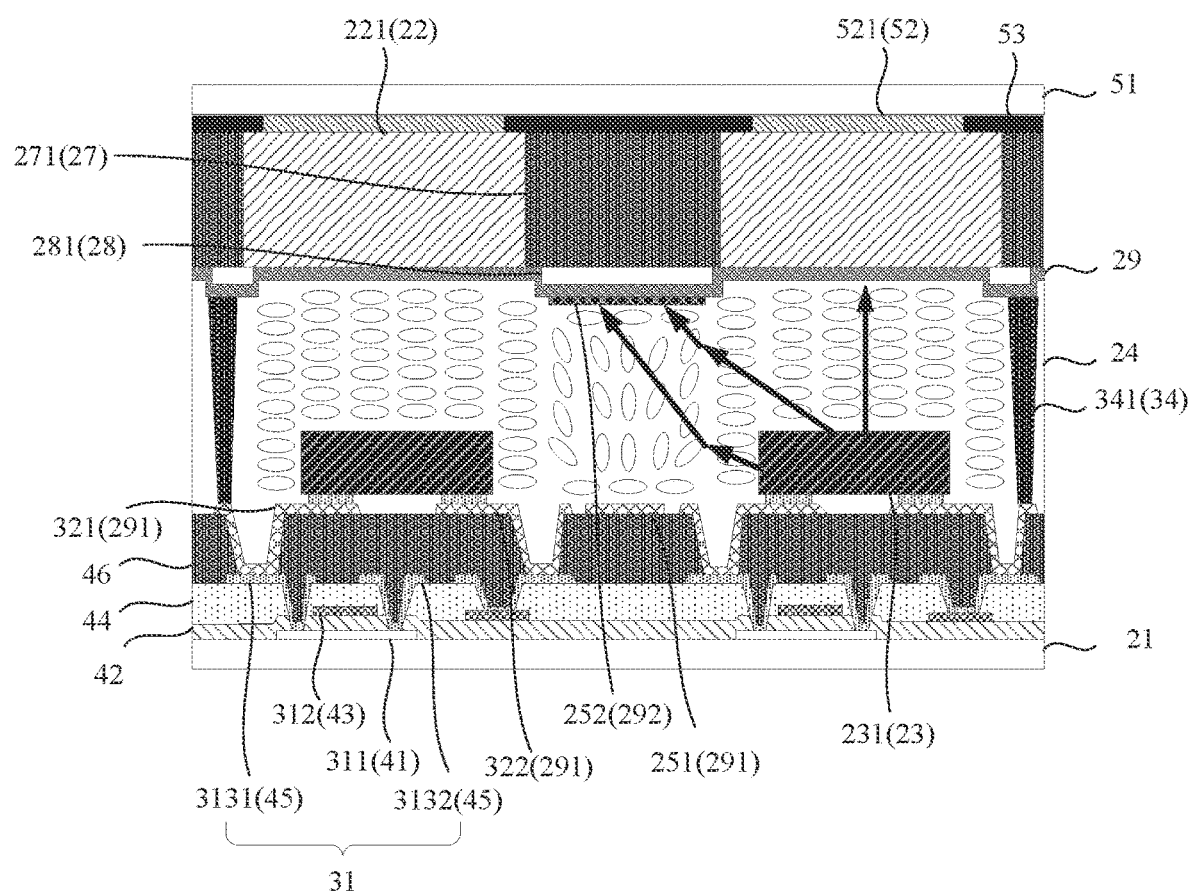
FIG. 6 schematically shows a second sectional view of a display panel in an embodiment of the present disclosure.

FIG. 6 schematically shows a second sectional view of a display panel in an embodiment of the present disclosure. As shown in FIG. 6, in some specific embodiments, the display panel further includes a dam layer 27 arranged on the first base substrate 21. The color conversion layer 22 includes a plurality of quantum dots 221, and the quantum dots 221 includes a photoluminescent material capable of conversing wavelength. For example, the quantum dots 221 may include an organic photoluminescent material such as CdSe and InP. Different quantum dots 221 have different colors. For example, the plurality of quantum dots 221 may include a red quantum dot, a green quantum dot, and a blue quantum dot.

Optionally, the quantum dots 221 may be doped with a reflective material. By doping the reflective material into the quantum dots 221, a light utilization efficiency of the quantum dots 221 may be improved.

The dam layer 27 includes a dam 271, which may include an opaque material. The dam 271 spaces the plurality of quantum dots 221 from each other. The second optical path adjustment portion 242 is specifically configured such that: the light incident to the second optical path adjustment portion 242 from the first optical path adjustment portion 241 is emitted towards a dam 271 in response to the second optical path adjustment portion 242 being in the first state; and at least part of the light incident to the second optical path adjustment portion 242 from the first optical path adjustment portion 241 is emitted towards at least one quantum dot 221 in response to the second optical path adjustment portion 242 being in the second state.

Optionally, the dam layer 27 includes a plurality of dams 271. An orthographic projection of at least one dam 271 on the first base substrate 21 corresponds to at least one second optical path adjustment portion 242. For example, the dams 271 are arranged in one-to-one correspondence with the second optical path adjustment portions 242. The orthographic projection of the at least one dam 271 on the first base substrate 21 at least partially overlaps with an orthographic projection of a second optical path adjustment portion 242 corresponding to the at least one dam 271 on the first base substrate 21.

Optionally, the orthographic projection of the at least one dam 271 on the first base substrate 21 covers the orthographic projection of the second optical path adjustment portion 242 corresponding to the at least one dam 271 on the first base substrate 21.

When the second optical path adjustment portion 242 is in the first state, the second optical path adjustment portion 242 may allow the light incident to the second optical path adjustment portion 242 from the first optical path adjustment portion 241 to be emitted towards a dam 271 corresponding to the second optical path adjustment portion 242. With continued reference to FIG. 6, for the right light-emitting device 231, the light emitted by the right light-emitting device 231 mainly falls into two parts, where one part of the light is emitted towards the quantum dot 221 above the light-emitting device 231 after passing through the first optical path adjustment portion 241, so as to achieve color conversion through the quantum dot 221; and the other part of the light is incident to the second optical path adjustment portion 242 after passing through the first optical path adjustment portion 241, and this part of the light travels from the optically denser medium to the optically thinner medium and thus is deflected upward. Since the orthographic projection of the dam 271 on the first base substrate 21 covers the orthographic projection of the second optical path adjustment portion 242 corresponding to the dam 271 on the first base substrate 21, if the deflected light still has a large light output angle, then the deflected light may be blocked by the dam 271 above the second light path adjustment portion 242 without being incident to the left quantum dot 221, thereby further improving the color crosstalk problem.

In some specific embodiments, when the second optical path adjustment portion 242 is in the second state, at least part of the light incident to the second optical path adjustment portion 242 from the first optical path adjustment portion 241 is emitted towards at least one quantum dot 221. In this way, the intensity of the light incident to each quantum dot 221 is increased, so that the display brightness may be improved, thereby reducing the display power consumption.

In some specific embodiments, the dam 271 may include a light absorption material, or the dam 271 may include a reflective material. By doping the reflective material into the dam 271, the light utilization efficiency of the quantum dot 221 may be improved. In the case where the dam 271 includes the reflective material, in order to prevent the light incident to the dam 271 from the second optical path adjustment portion 242 from being reflected by the dam 271, in some specific embodiments, the display panel further includes a light absorption layer 28 arranged on a side of the dam layer 27 proximate to the first base substrate 21. The light absorption layer 28 includes a light absorption portion 281, and an orthographic projection of the light absorption portion 281 on the first base substrate 21 at least partially overlaps with the orthographic projection of the dam 271 on the first base substrate 21.

In the embodiments of the present disclosure, the light absorption portion 281 may absorb the light emitted from the second optical path adjustment portion 242 and the light reflected back to the second optical path adjustment portion 242 by the dam 271, thereby preventing the light crosstalk caused by a plurality of reflections of the light between the dam layer 27 and the first base substrate 21.

In some specific embodiments, the light absorption portion 281 includes a plurality of color resists stacked in a thickness direction of the display panel. Different color resists have different colors. For example, the plurality of color resists may include a red color resist, a green color resist, and a blue color resist. Alternatively, the optical absorption unit 281 includes a black matrix.

In some specific embodiments, the liquid crystal in the liquid crystal layer 24 may include a positive liquid crystal or a negative liquid crystal. The positive liquid crystal may refer to a liquid crystal material meeting ε1>ε2 and n1>n2, where ε1 is a dielectric constant of the positive liquid crystal in a horizontal state, ε2 represents a dielectric constant of the positive liquid crystal in a vertical state, n1 represents a refractive index of the positive liquid crystal in the horizontal state, and n2 represents a refractive index of the positive liquid crystal in the vertical state. The negative liquid crystal may refer to a liquid crystal material meeting ε3<ε4 and n3<n4, where ε3 is a dielectric constant of the negative liquid crystal in a horizontal state, ε4 represents a dielectric constant of the negative liquid crystal in a vertical state, n3 represents a refractive index of the negative liquid crystal in the horizontal state, and n4 represents a refractive index of the negative liquid crystal in the vertical state.

In embodiments of the present disclosure, in the case where the liquid crystal in the liquid crystal layer 24 includes the positive liquid crystal, the liquid crystal in the first optical path adjustment portion 241 may be remained in the horizontal state at all times, and an initial state of the liquid crystal in the second optical path adjustment portion 242 may also be the horizontal state. The initial state of the liquid crystal in the second optical path adjustment portion 242 may refer to a state of the liquid crystal in the second optical path adjustment portion 242 when the first driving component 25 does not apply an electric field to the second optical path adjustment portion 242. As previously described, when the second optical path adjustment portion 242 is in the second state, the refractive index of the second optical path adjustment portion 242 is substantially equal to the refractive index of the first optical path adjustment portion 241. Accordingly, when the second optical path adjustment portion 242 is expected to be in the second state, the liquid crystal in the second optical path adjustment portion 242 may be remained in the initial state, that is, the liquid crystal in the second optical path adjustment portion 242 may be remained in the horizontal state. When the first driving component 25 applies an electric field to the second optical path adjustment portion 242, at least part of the liquid crystal in the second optical path adjustment portion 242 may be remained in the vertical state. Since the liquid crystal in the first optical path adjustment portion 241 is remained in the horizontal state at all times, the refractive index of the second optical path adjustment portion 242 is less than the refractive index of the first optical path adjustment portion 241 in this case, so that the light incident to the second optical path adjustment portion 242 from the first optical path adjustment portion 241 is deflected to narrow the light output angle. As described above, since the refractive index of the second optical path adjustment portion 242 is less than the refractive index of the first optical path adjustment portion 241 when the second optical path adjustment portion 242 is in the first state, in the case where the liquid crystal in the liquid crystal layer 24 includes the positive liquid crystal, the first state may specifically refer to a state in which at least part of the liquid crystal in the second optical path adjustment portion 242 is remained in the vertical state by applying the electric field.

In the case where the liquid crystal in the liquid crystal layer 24 includes the negative liquid crystal, the liquid crystal in the first optical path adjustment portion 241 may be remained in the vertical state at all times, and an initial state of the liquid crystal in the second optical path adjustment portion 242 may also be the vertical state. When the second optical path adjustment portion 242 is expected to be in the second state, the liquid crystal in the second optical path adjustment portion 242 may be remained in the initial state, that is, the liquid crystal in the second optical path adjustment portion 242 may be in the vertical state. When the first driving component 25 applies an electric field to the second optical path adjustment portion 242, at least part of the liquid crystal in the second optical path adjustment portion 242 may be in the horizontal state. Since the liquid crystal in the first optical path adjustment portion 241 are remained in the vertical state at all times, the refractive index of the second optical path adjustment portion 242 is less than the refractive index of the first optical path adjustment portion 241 in this case, so that the light incident to the second optical path adjustment portion 242 from the first optical path adjustment portion 241 is deflected to narrow the light output angle. Therefore, in the case where the liquid crystal in the liquid crystal layer 24 includes the negative liquid crystal, the first state may specifically refer to a state in which at least part of the liquid crystal in the second optical path adjustment portion 242 is remained in the horizontal state by applying the electric field.

In some specific embodiments, the display panel further includes a first alignment layer (not shown) arranged on a side of the liquid crystal layer 24 proximate to the first base substrate 21 and a second alignment layer (not shown) arranged on a side of the liquid crystal layer 24 away from the first base substrate 21. The first alignment layer and the second alignment layer have a same alignment angle. In this way, when the first driving component 25 does not apply an electric field to the second optical path adjustment portion 242, the liquid crystal in the second optical path adjustment portion 242 may be remained in the initial state by the first alignment layer and the second alignment layer.

In some other specific embodiments, the liquid crystal in the liquid crystal layer 24 includes a self-oriented liquid crystal material. In this way, when the first driving component 25 does not apply an electric field to the second optical path adjustment portion 242, the liquid crystal in the second optical path adjustment portion 242 may also be in the initial state without the help of the first alignment layer and the second alignment layer. Therefore, the first alignment layer and the second alignment layer may be omitted, and the process steps are simplified.

In some specific embodiments, an orthographic projection of the first driving component 25 on the first base substrate 21 is spaced apart from the orthographic projection of the first optical path adjustment portion 241 on the first base substrate 21, so as to prevent the electric field generated by the first driving component 25 from interfering with the liquid crystal in the first optical path adjustment portion 241, and thus the liquid crystal in the first optical path adjustment portion 241 may be remained in the horizontal state (or the vertical state) at all times.

In some specific embodiments, an electrical signal provided to the first driving component 25 may include a DC signal or an AC signal. Optionally, in the case where the electrical signal provided to the first driving component 25 includes the AC signal, a voltage of the AC signal may be set to be 1 V to 50 V. By providing the AC signal to the first driving component 25, the liquid crystal in the second optical path adjustment portion 242 may be prevented from being polarized, and a service life of the second optical path adjustment portion 242 may be extended.

In some specific embodiments, the first driving component 25 may include two plate-like electrodes arranged on two opposite sides of the liquid crystal layer 24, or a slot electrode arranged on a side of the liquid crystal layer 24. The first driving component 25 including the two plate-like electrodes will be first described below in combination with FIG. 6.

In an embodiment of the present disclosure, the display panel further includes: a first electrode layer 291 arranged on the side of the liquid crystal layer 24 proximate to the first base substrate 21, and a second electrode layer 292 arranged on the side of the liquid crystal layer 24 away from the first base substrate 21. The first driving component 25 includes a first electrode 251 in the first electrode layer 291 and a second electrode 252 in the second electrode layer 292. Each of the first electrode 251 and the second electrode 252 includes a plate-like electrode. Optionally, an orthographic projection of the second electrode 252 on the first base substrate 21 covers an orthographic projection of the first electrode 251 on the first base substrate 21.

In embodiments of the present disclosure, the orthographic projection of the second electrode 252 on the first base substrate 21, the orthographic projection of the dam 271 on the first base substrate 21, the orthographic projection of the light absorption portion 281 on the first base substrate 21, and the orthographic projection of the second optical path adjustment portion 242 on the first base substrate 21 at least partially overlap with one another. A material of the second electrode 252 may include a conductive light-transmitting material, so that the light emitted from the second optical path adjustment portion 242 towards the second electrode 252 may pass through the second electrode 252, so as to be absorbed by the light absorption portion 281. In this way, it is possible to avoid the reflection of the light back to the second optical path adjustment portion 242 by the second electrode 252, thereby preventing a plurality of reflections of the light between the second electrode 252 and the first base substrate 21 and avoiding the color crosstalk and other problems caused thereby.

In an embodiment of the present disclosure, an area of the orthographic projection of the second electrode 252 on the first base substrate 21 may be substantially equal to an area of the orthographic projection of the first electrode 251 on the first base substrate 21. Alternatively, the area of the orthographic projection of the second electrode 252 on the first base substrate 21 is larger than the area of the orthographic projection of the first electrode 251 on the first base substrate 21.

In some specific embodiments, the display panel further includes a pixel circuit layer 26 arranged between the light-emitting device layer 23 and the first base substrate 21. The pixel circuit layer 26 includes a first thin film transistor 31, and the light-emitting device 231 is electrically connected with a first electrode of the first thin film transistor 31 through a first connection electrode 321. The first connection electrode 321 and the first electrode 251 are arranged in a same layer and are made of a same material.

It should be noted that in the embodiments of the present disclosure, being arranged in a same layer refers to being formed through a same patterning process. Depending on different specific patterns, a patterning process may include a plurality of exposure, development, or etching processes, and the specific patterns in the formed layer structure may be continuous or discontinuous. In addition, the specific patterns may be at different heights or have different thicknesses.

Optionally, the first electrode layer 291 is on a side of the first alignment layer proximate to the first base substrate 21, and the second electrode layer 292 is on a side of the second alignment layer away from the first base substrate 21.

In embodiments of the present disclosure, the first thin film transistor 31 may include a light emission control transistor of a pixel circuit, and the first thin film transistor 31 may be electrically connected with a driving transistor. The driving transistor may generate a driving current in response to a voltage difference between a gate electrode and a source electrode of the driving transistor. The first thin film transistor 31 may be configured to transmit the driving current generated by the driving transistor to the first connection electrode 321 in response to a control of a light emission control signal, so that the driving current is transmitted to the light-emitting device 231 through the first connection electrode 321, so as to drive the light-emitting device 231 to emit light.

In an embodiment of the present disclosure, the area of the orthographic projection of the second electrode 252 on the first base substrate 21 is larger than the area of the orthographic projection of the first electrode 251 on the first base substrate 21. In this way, the area of the first electrode 251 may be set as small as possible, so as to prevent a layout of the first electrode 251 from affecting the first connection electrode 321 and reduce a risk of short circuit of the first connection electrode 321 or a related circuit element. On this basis, the area of the second electrode 252 may be set as large as possible, so that a range of the electric field generated by the first driving component 25 may be as large as possible. In addition, an edge electric field of the electric field may keep liquid crystal under the edge electric field in an inclined state that is between the vertical state and the horizontal state, and light emitted from the first optical path adjustment portion 241 may be deflected to a certain extent at this position. Then, the light continues to be deflected when reaching the second optical path adjustment portion 242, which is conducive to further narrowing of the light output angle of the light-emitting device 231, thereby improving the color crosstalk problem better.

In an embodiment of the present disclosure, the pixel circuit layer 26 includes a semiconductor layer 41, a gate insulation layer 42, a gate layer 43, an interlayer insulation layer 44, a source and drain metal layer 45, and an organic insulation layer 46. The active layer 41, the gate insulation layer 42, the gate layer 43, the interlayer insulation layer 44, the source and drain metal layer 45, and the organic insulation layer 46 are sequentially arranged between the first base substrate 21 and the light-emitting device layer 23 in a direction gradually away from the first base substrate 21. An active layer 311 of the first thin film transistor 31 is in the semiconductor layer 41, a gate electrode 312 of the first thin film transistor 31 is in the gate layer 43, and a first electrode 3131 and a second electrode 3132 of the first thin film transistor are in the source and drain metal layer 45. The active layer 311 of the first thin film transistor includes a first electrode connection portion, a second electrode connection portion, and a channel portion between the first electrode connection portion and the second electrode connection portion, and the channel portion is arranged facing the gate electrode 312. The first electrode 3131 of the first thin film transistor 31 is electrically connected with the first electrode connection portion through a first via hole penetrating the interlayer insulating layer 44 and the gate insulating layer 42, and the second electrode 3132 of the first thin film transistor 31 is electrically connected with the second electrode connection portion through a second via hole penetrating the interlayer insulating layer 44 and the gate insulating layer 42. The first connection electrode 321 is electrically connected with the first electrode 3131 of the first thin film transistor 31 through a third via hole penetrating the organic insulation layer 46. One of the first electrode 3131 and the second electrode 3132 of the first thin film transistor 31 is a source electrode, and the other is a drain electrode. Optionally, the second electrode 3132 of the first thin film transistor 31 may be electrically connected with the driving transistor, so that a line between and the driving transistor and the first connection electrode 321 may be closed through the first thin film transistor, in response to the control of the light emission control signal, and then the driving current generated by the driving transistor is transmitted to the first connection electrode 321.

Optionally, a material of the active layer may include a low-temperature polysilicon semiconductor, an oxide semiconductor, and the like.

Figure 7:
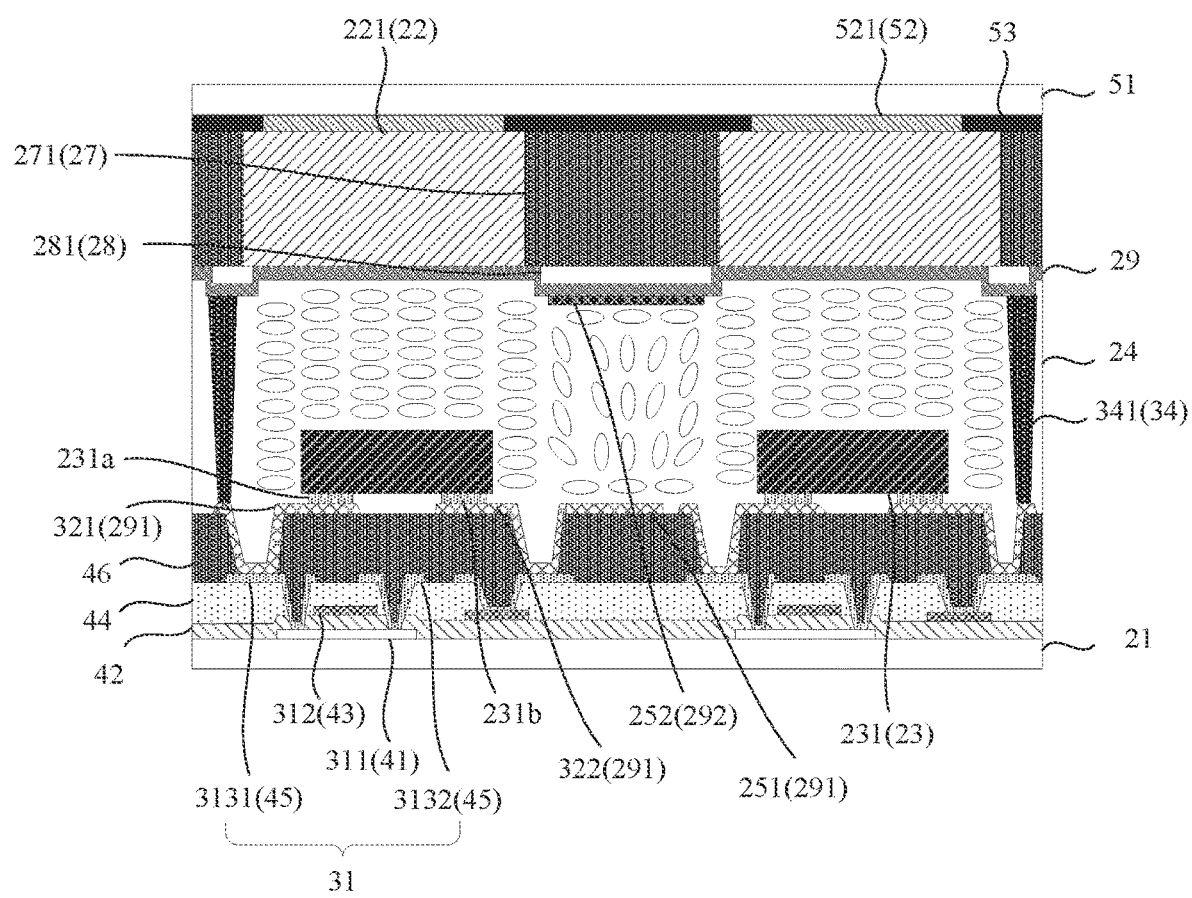
FIG. 7 schematically shows a third sectional view of a display panel in an embodiment of the present disclosure.

FIG. 7 schematically shows a third sectional view of a display panel in an embodiment of the present disclosure. As shown in FIG. 7, in some specific embodiments, the second electrode 252 is electrically connected to a first voltage terminal, and the first electrode 251 is electrically connected to a second terminal 231a of the light-emitting device 231 and a second voltage terminal. Optionally, the first electrode layer 291 further includes a second connection electrode 322. The second terminal 231a of the light-emitting device 231 may be electrically connected to the second voltage terminal through the second connection electrode 322. The second voltage terminal may be a constant voltage terminal, such as a low-level voltage terminal VSS. In the embodiments of the present disclosure, the first voltage terminal may also be a constant voltage terminal, so that a constant electric field is generated between the first electrode 251 and the second electrode 252 to remain the second optical path adjustment portion 242 in the first state.

Figure 8:
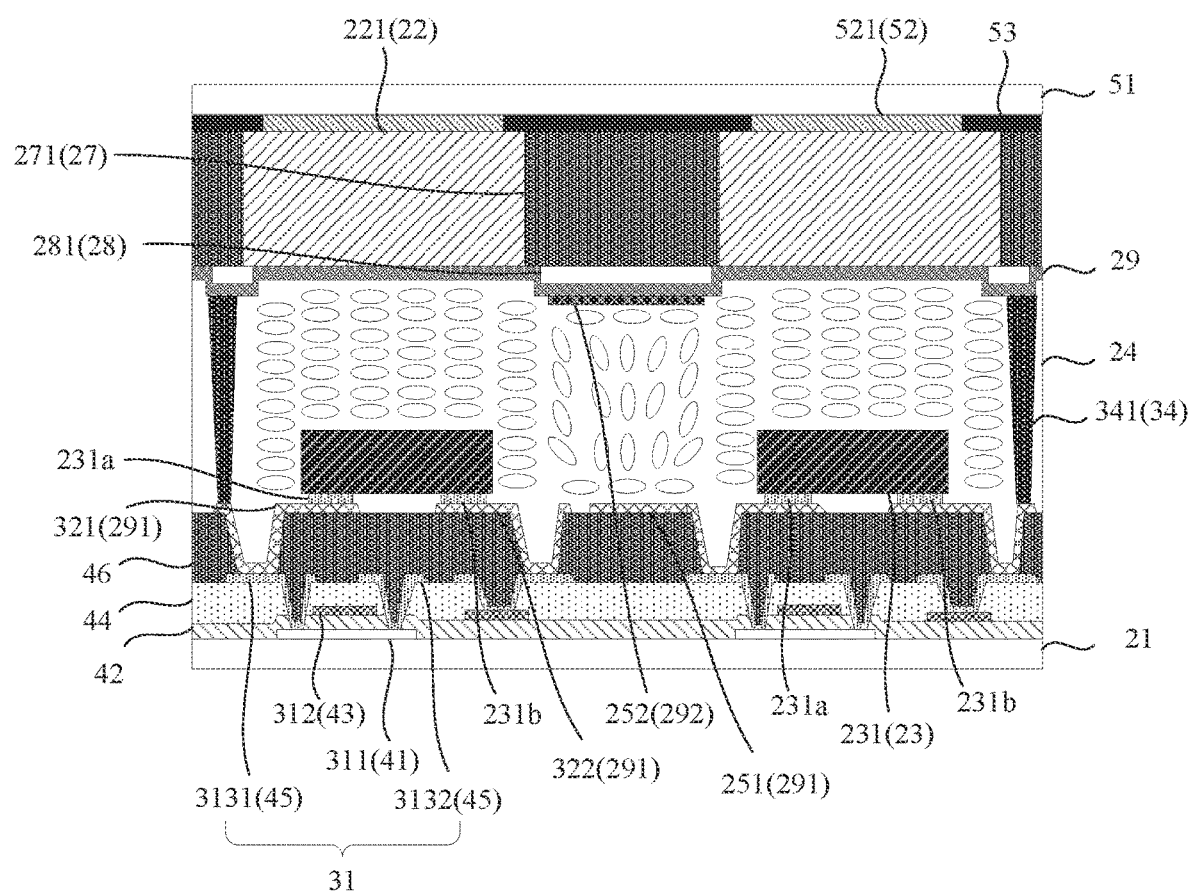
FIG. 8 schematically shows a fourth sectional view of a display panel in an embodiment of the present disclosure.

FIG. 8 schematically shows a fourth sectional view of a display panel in an embodiment of the present disclosure. As shown in FIG. 8, in some specific embodiments, the second electrode 252 is electrically connected with the first voltage terminal, and the first electrode 251 is electrically connected with the first terminal 231b of the light-emitting device 231. Thus, whether the electric field is generated between the first electrode 251 and the second electrode 252 may be controlled by an electrical signal provided to the first terminal 231b of the light-emitting device 231, so that the second optical path adjustment portion 242 may switch between the first state and the second state.

The first electrode 251 in the above-mentioned arrangement may keep the electrical signal of the second terminal 231a (or the first terminal 231b) of the light-emitting device 231 and the electrical signal of the first electrode 251 consistent. Therefore, it is possible to avoided that a difference between the electrical signals of the second terminal 231a of the light-emitting device 231 and the first electrode 251 causes interference to the deflection of the liquid crystal.

Figure 9:
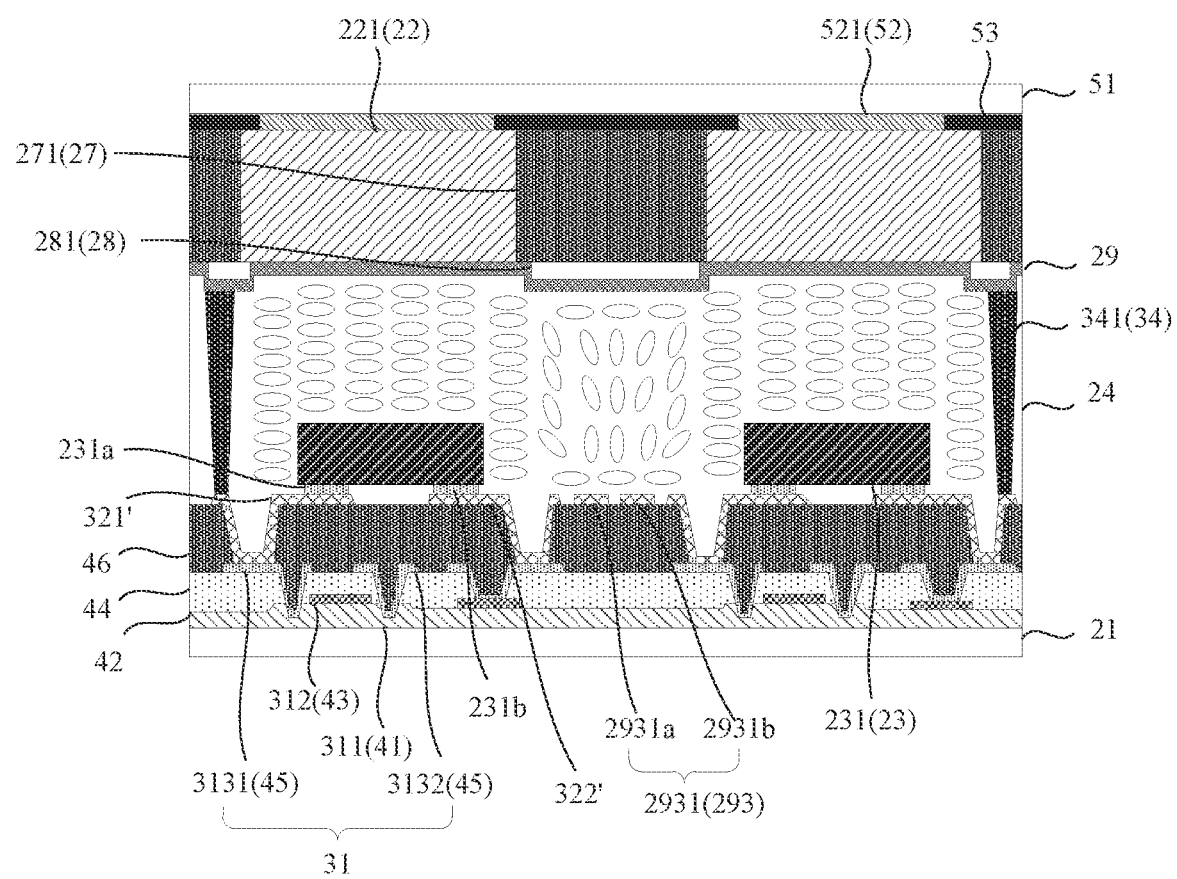
FIG. 9 schematically shows a fifth sectional view of a display panel in an embodiment of the present disclosure.

FIG. 9 schematically shows a fifth sectional view of a display panel in an embodiment of the present disclosure. As shown in FIG. 9, the first driving component 25 including the slit electrode will be described below.

In some specific embodiments, the display panel further includes a third electrode layer 293 arranged on the side of the liquid crystal layer 24 proximate to the first base substrate 21, the first driving component 25 includes a third electrode 2931 located in the third electrode layer 293, the third electrode 2931 includes a first sub electrode 2931a and a second sub electrode 2931b spaced apart from each other, and the first sub electrode 2931a and the second sub electrode 2931b constitute the slit electrode. The first driving component 25 is configured to generate an electric field in response to a first electric signal provided to the first sub electrode 2931a and a second electric signal provided to the second sub electrode 2932b, where voltages of the first electric signal and the second electric signal are different.

In the embodiments of the present disclosure, after the first driving component 25 is provided with a driving signal, the first driving component 25 forms an electric field, and the liquid crystal in the second optical path adjustment portion 242 is deflected under an action of a horizontal component of an edge electric field of the electric field, so that the refractive index of the second optical path adjustment portion 242 is reduced, resulting in the deflection of the light incident to the second optical path adjustment portion 242 from the first optical path adjustment portion 241, thereby narrowing the light output angle of the light-emitting device 231. Optionally, the third electrode layer 293 is on a side of the first alignment layer 331 proximate to the first base substrate 21, and a first connection electrode 321' and a second connection electrode 322' may be in the third electrode layer. It should be noted that the non-detailed description in this embodiment of the present disclosure may refer to the aforementioned embodiments, and details will not be repeated here.

In some other specific embodiments, the display panel further includes a fourth electrode layer arranged on the side of the liquid crystal layer 24 away from the first base substrate 21, the first driving component 25 includes a fourth electrode in the fourth electrode layer, and the fourth electrode includes a slit electrode. Optionally, the fourth electrode layer 293 is on the side of the second alignment layer 332 away from the first base substrate 21. The display panel further includes a fifth electrode layer arranged on the side of the liquid crystal layer 24 proximate to the first base substrate 21. The fifth electrode layer may be on the side of the first alignment layer 331 proximate to the first base substrate 21, and the first connection electrode 321 may be in the fifth electrode layer. For the first driving component 25 in the above-described arrangement, the electrode (i.e., the fourth electrode) of the first driving component 25 and the first connection electrode are located in different layers, so as to better reduce an influence on the wiring of the first connection electrode.

In other specific embodiments, the liquid crystal in the liquid crystal layer 24 includes a first liquid crystal and a second liquid crystal, and the second liquid crystal is obtained by irradiating a photopolymer liquid crystal material with ultraviolet light under a preset electric field. The second liquid crystal is configured to keep a long axis of the first liquid crystal in the second optical path adjustment portion 242 in a preset direction, so that the second optical path adjustment portion 242 is remained in the first state at all times.

In an embodiment of the present disclosure, after a cell alignment process of the display panel is completed, a preset electric field may be applied to the second optical path adjustment portion 242 through the first driving component 25 to deflect the first liquid crystal and the second liquid crystal in the second optical path adjustment portion 242. At this point, the active monomer in the liquid crystal molecules may be polymerized and cross-linked by ultraviolet light irradiation curing, so that arrangements of the first liquid crystal and the second liquid crystal may be fixed. In this way, a driving signal is not required to be provided to the second optical path adjustment portion 242 in the subsequent use, so that the power consumption may be reduced.

In some specific embodiments, the display panel further includes a second base substrate 51 arranged opposite to the first base substrate 21, a color filter layer 52 and a black matrix layer 53 that are arranged on a side of the color conversion layer 22 proximate to the second base substrate 51, where the black matrix layer 53 is provided with openings, the color filter layer 52 includes a plurality of filter portions 521, and the plurality of filter portions 521 are provided in the openings of the black matrix layer 53.

In some specific embodiments, the display panel further includes an encapsulation layer 54 arranged on a side of the light absorption layer 28 away from the second substrate 51. The encapsulation layer 54 is used to encapsulate each film layer on the encapsulation layer 54 and the second substrate 51. The second electrode layer 292 in the above-mentioned embodiments may be arranged on a side of the encapsulation layer 54 away from the second base substrate 51.

In some specific embodiments, the display panel further includes a frame sealant (not shown), which is used to seal the liquid crystal layer 24. Optionally, the frame sealant may have a large thickness, so that the liquid crystal layer 24 has a large cell thickness, thereby solving the problem of sagging in the middle region of the liquid crystal layer 24.

In some other specific embodiments, the display panel further includes a spacer layer 34 between the color conversion layer 22 and the first base substrate 21. The spacer layer 34 includes a plurality of spacers 341. An orthographic projection of the spacer on the first base substrate 21 is spaced apart from the orthographic projection of the first optical path adjustment portion 241 on the first base substrate 21. Optionally, a thickness of the spacer 341 may be set to be 5 μm to 30 μm.

In an embodiment of the present disclosure, one end of the spacer 341 may be in contact with the first alignment layer, and the other terminal of the spacer 341 may be in contact with the second alignment layer. Cell thicknesses of the liquid crystal layer 24 at different positions may be kept consistent through the spacers 341. In this way, the problem of sagging in the middle region of the liquid crystal layer 24 may be improved, without keeping the liquid crystal layer 24 with a larger cell thickness, while the smaller cell thickness is conducive to a further improvement of the above color crosstalk problem.

In view of above, it is possible for the display panel according to embodiments of the present disclosure to control the light output angle of the light-emitting device 231 through the first optical path adjustment portion 241 and the second optical path adjustment portion 242, so that when displaying a pure color picture, the problem of color crosstalk may be solved and the color purity may be improved; and when displaying a mixed color, a plurality of light-emitting devices 231 may be used as light sources of a quantum dot 221, thereby improving the display brightness and reducing the display power consumption.

Figure 10:
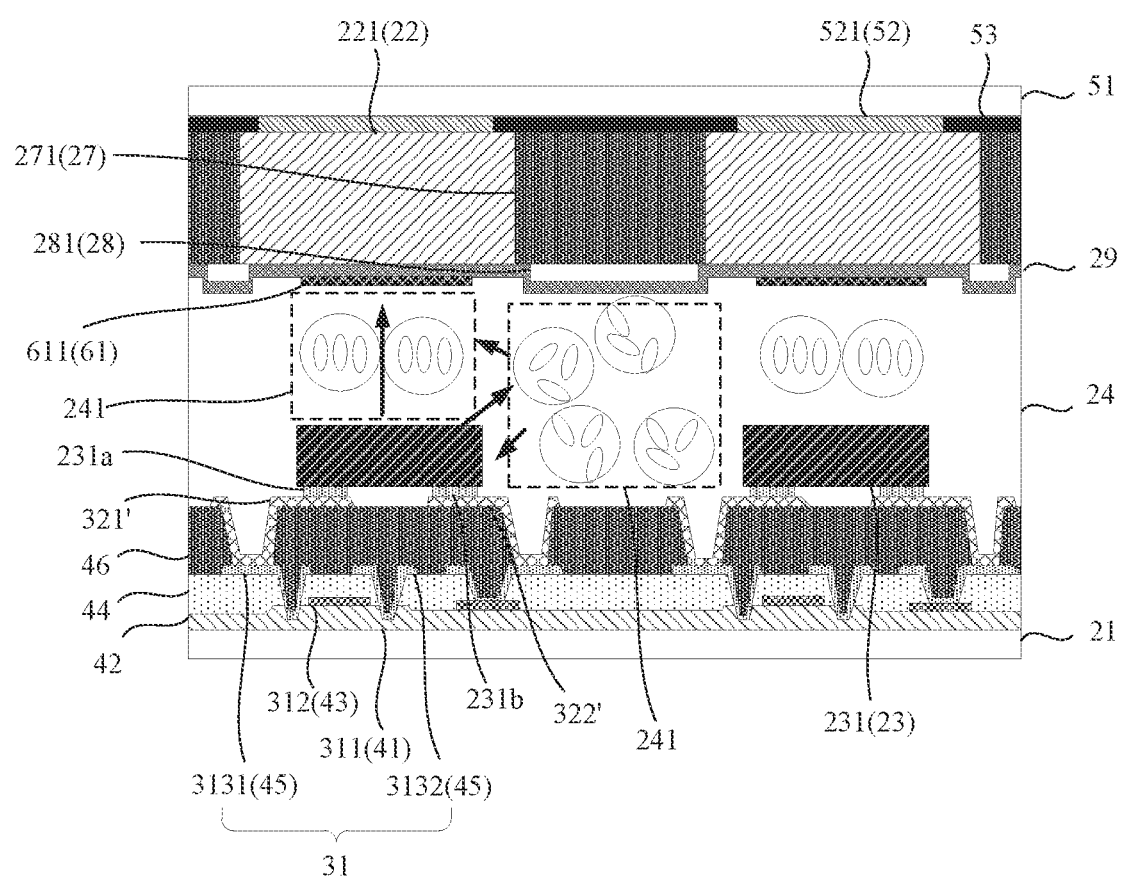
FIG. 10 schematically shows a sixth sectional view of a display panel in an embodiment of the present disclosure.
Figure 11:
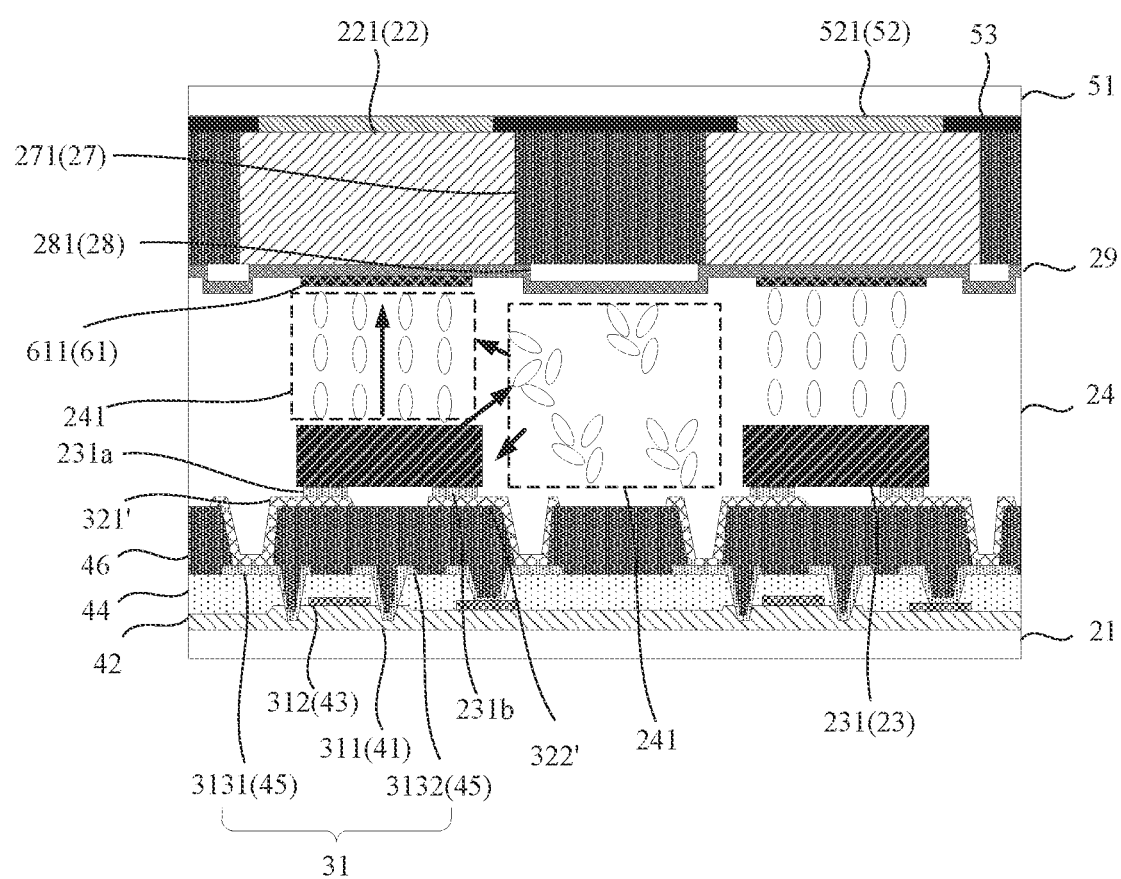
FIG. 11 schematically shows a seventh sectional view of a display panel in an embodiment of the present disclosure.

FIG. 10 schematically shows a sixth sectional view of a display panel in an embodiment of the present disclosure. FIG. 11 schematically shows a seventh sectional view of a display panel in an embodiment of the present disclosure. A third liquid crystal in FIG. 10 includes a polymer dispersed liquid crystal, and the third liquid crystal in FIG. 11 includes a liquid crystal of an interpenetrating polymer network type. The case that the light incident to the second optical path adjustment portion 242 from the first optical path adjustment portion 241 may be scattered in the embodiments of the present disclosure will be further described in combination with FIG. 10 and FIG. 11.

In some specific embodiments, the display panel further includes a second driving component 61 arranged on the first base substrate 21.

Each of the liquid crystal in the first optical path adjustment portion 241 and the liquid crystal in the second optical path adjustment portion 242 includes a third liquid crystal. Optionally, the third liquid crystal includes at least one of a polymer dispersed liquid crystal or a liquid crystal of an interpenetrating polymer network type. The first optical path adjustment portion 241 has a third state and a fourth state. The first optical path adjustment portion 241 is configured to switch between the third state and the fourth state in response to an electric field applied by the second driving component 61.

In response to the first optical path adjustment portion 241 being in the third state and the second optical path adjustment portion 242 being in the first state, the third liquid crystal in the first optical path adjustment portion 241 is in an ordered arrangement, and the third liquid crystal in the second optical path adjustment portion 242 is in a disordered arrangement, so that the light incident to the second optical path adjustment portion 242 from the first optical path adjustment portion is scattered. In response to the first optical path adjustment portion 241 being in the fourth state and the second optical path adjustment portion 242 being in the first state, each of the third liquid crystal in the second optical path adjustment portion 242 and the third liquid crystal in the first optical path adjustment portion is in a disordered arrangement.

In the embodiments of the present disclosure, when the third liquid crystal in the first optical path adjustment portion 241 is in the ordered arrangement, the first optical path adjustment portion 241 may transmit light. For example, a long axis direction of the third liquid crystal is the same as the thickness direction of the display panel, that is, the long axis direction of the third liquid crystal is perpendicular to a plane where the first base substrate 21 is located. When the third liquid crystals in the second optical path adjustment portion 242 is in the disordered arrangement, the light incident to the second optical path adjustment portion 242 from the first optical path adjustment portion may be scattered, and by proper configuration, the second optical path adjustment portion 242 may be made opaque, so that the light incident to the second optical path adjustment portion 242 from the first optical path adjustment portion cannot pass through the second optical path adjustment portion 242, thereby preventing the color crosstalk problem.

It should be noted that in the embodiments of the present disclosure, the light incident to the second optical path adjustment portion 242 from the first optical path adjustment portion 241 may be reflected in addition to being scattered, which depends on an actual configuration of the third liquid crystal in the second optical path adjustment portion 242 and may be determined as desired.

In some specific embodiments, the display panel further includes a fourth electrode layer on a side of the liquid crystal layer 24 away from the first base substrate 21 and a pixel circuit layer between the light-emitting device layer 23 and the first base substrate 21. The second driving component 61 includes a fourth electrode 611 in the fourth electrode layer, which is electrically connected with a third voltage terminal. Optionally, the third voltage terminal is a constant voltage terminal.

The pixel circuit layer 26 includes a first thin film transistor 31, the first terminal 231*b* of the light-emitting device 231 is electrically connected with the first thin film transistor 31, and the second terminal 231*a* of the light-emitting device 231 is electrically connected with a fourth voltage terminal. Optionally, the fourth voltage terminal is a constant voltage terminal.

Optionally, the light-emitting device 231 may include a plurality of film layers stacked, where the plurality of film layers include a first light-emitting electrode layer and a second light-emitting electrode layer, the first terminal 231*b* of the light-emitting device 231 may be electrically connected with the first light-emitting electrode layer, and the second terminal 231*a* of the light-emitting device 231 may be electrically connected with the second light-emitting electrode layer.

Optionally, the first light-emitting electrode layer and the first terminal 231*b* may be on a side of the second light-emitting electrode layer and the second terminal 231*a* proximate to the first base substrate 21. In this case, since the second light-emitting electrode layer and the second terminal 231*a* are closer to the fourth electrode 611, and the second light-emitting electrode layer is electrically connected with the second terminal 231*a* of the light-emitting device 231, the second driving component 61 may be configured to generate an electric field in response to a voltage difference between the second terminal 231*a* of the light-emitting device 231 and the fourth electrode 611. In this way, after the display panel is powered on, since the third voltage terminal and the fourth voltage terminal are both constant voltage terminals, a constant electric field may be generated between the second light-emitting electrode layer and the second terminal 231*a* of the light-emitting device 231 and the fourth electrode 611, so that the first optical path adjustment portion 241 may be remained in the third state after switching to the third state.

Optionally, the first terminal 231*b* of the first light-emitting electrode layer may be on a side of the second light-emitting electrode layer and the second terminal 231*a* away from the first base substrate 21. In this case, since the first light-emitting electrode layer and the first terminal 231*b* are closer to the fourth electrode 611, and the first light-emitting electrode layer is electrically connected with the first terminal 231*b* of the light-emitting device 231, the second driving component 61 may be configured to generate an electric field in response to a voltage difference between the fourth electrode 611 and the first terminal 231*b* of the light-emitting device 231. In this way, after the display panel is powered on, when the first terminal 231*b* of the light-emitting device 231 receives a driving signal transmitted by the first thin film transistor 31, the light-emitting device 231 emits light, while an electric field is generated between the first light-emitting electrode layer and the first terminal 231*b* of the light-emitting device 231 and the fourth electrode 611, so that the first optical path adjustment portion 241 is switched to the third state only when the light-emitting device 231 emits light, thereby reducing the power consumption.

It should be noted that the non-detailed description in this embodiment of the present disclosure may refer to the aforementioned embodiments. For example, structures such as the color conversion layer 22 and the dam layer 27 may be the same as the aforementioned embodiments, and details will not be repeated here.

The present disclosure further provides a display apparatus, and the display apparatus includes the display panel described above.

In other embodiments of the present disclosure, the display apparatus may include a tablet personal computer (PC), a smart phone, a personal digital assistant (PDA), a portable multimedia player, a game console or a watch type electronic device, etc. However, the embodiments of the present disclosure are not intended to limit the type of the display apparatus. In some exemplary embodiments, the display apparatus may be used not only in a large-sized electronic device such as a television (TV) or an external billboard, but also in a medium-sized or small-sized electronic device such as a PC, a laptop computer, a car navigation device, or a camera.

Embodiments of the present disclosure have been described above. However, these embodiments are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A display panel, comprising:
   a first base substrate;
   a color conversion layer arranged on the first base substrate;
   a light-emitting device layer arranged between the first base substrate and the color conversion layer; and
   a liquid crystal layer arranged between the light-emitting device layer and the color conversion layer,
   wherein the light-emitting device layer comprises a light-emitting device; and the liquid crystal layer comprises a first optical path adjustment portion and a second optical path adjustment portion spaced apart from each other, wherein an orthographic projection of the first optical path adjustment portion on the first base substrate at least partially overlaps with an orthographic projection of the light-emitting device on the first base substrate, and an orthographic projection of the second optical path adjustment portion on the first base substrate is spaced apart from the orthographic projection of the light-emitting device on the first base substrate;

wherein the second optical path adjustment portion has at least a first state; and in response to the second optical path adjustment portion being in the first state, in light emitted by the light-emitting device, light incident to the second optical path adjustment portion through the first optical path adjustment portion is refracted so as to narrow a light output angle of the light-emitting device, or is scattered for at least once; and wherein the display panel further comprises:

a second driving component arranged on the first base substrate, wherein each of a liquid crystal in the first optical path adjustment portion and a liquid crystal in the second optical path adjustment portion comprises a third liquid crystal, the first optical path adjustment portion has a third state and a fourth state, and the first optical path adjustment portion is configured to switch between the third state and the fourth state in response to an electric field applied by the second driving component; and wherein in response to the first optical path adjustment portion being in the third state and the second optical path adjustment portion being in the first state, the third liquid crystal in the first optical path adjustment portion is in an ordered arrangement, and the third liquid crystal in the second optical path adjustment portion is in a disordered arrangement, so that the light incident to the second optical path adjustment portion from the first optical path adjustment portion is scattered; in response to the first optical path adjustment portion being in the fourth state and the second optical path adjustment portion being in the first state, the third liquid crystal in the second optical path adjustment portion and the third liquid crystal in the first optical path adjustment portion are in a disordered arrangement.

2. The display panel according to claim 1, wherein the display panel further comprises:

a first driving component arranged on the first base substrate, wherein the second optical path adjustment portion has the first state and a second state, and the second optical path adjustment portion is configured to switch between the first state and the second state in response to an electric field applied by the first driving component; in response to the second optical path adjustment portion being in the first state, a refractive index of the second optical path adjustment portion is less than a refractive index of the first optical path adjustment portion, so that the light incident to the second optical path adjustment portion from the first optical path adjustment portion is refracted; and in response to the second optical path adjustment portion being in the second state, the refractive index of the second optical path adjustment portion is substantially equal to the refractive index of the first optical path adjustment portion.

3. The display panel according to claim 2, wherein an orthographic projection of the first driving component on the first base substrate is spaced apart from the orthographic projection of the first optical path adjustment portion on the first base substrate.

4. The display panel according to claim 2, wherein the display panel further comprises:

a first electrode layer arranged on a side of the liquid crystal layer proximate to the first base substrate; and a second electrode layer arranged on a side of the liquid crystal layer away from the first base substrate, wherein the first driving component comprises a first electrode in the first electrode layer and a second electrode in the second electrode layer.

5. The display panel according to claim 4, wherein the display panel further comprises a pixel circuit layer arranged between the light-emitting device layer and the first base substrate; and the pixel circuit layer comprises a first thin film transistor, and a first terminal of the light-emitting device is electrically connected with a first electrode of the first thin film transistor through a first connection electrode, wherein the first connection electrode and the first electrode of the first driving component are arranged in a same layer and made of a same material.

6. The display panel according to claim 5, wherein the second electrode of the first driving component is electrically connected with a first voltage terminal, and the first electrode of the first driving component is electrically connected with a second terminal of the light-emitting device and a second voltage terminal; or the second electrode of the first driving component is electrically connected with the first voltage terminal, and the first electrode of the first driving component is electrically connected with the first terminal of the light-emitting device.

7. The display panel according to claim 2, wherein the display panel further comprises a third electrode layer arranged on a side of the liquid crystal layer proximate to the first base substrate, the first driving component comprises a third electrode in the third electrode layer, and the third electrode comprises a first sub electrode and a second sub electrode spaced apart from each other, wherein the first driving component is configured to generate the electric field in response to a first electric signal provided to the first sub electrode and a second electric signal provided to the second sub electrode.

8. The display panel according to claim 2, wherein an electrical signal provided to the first driving component comprises an AC signal.

9. The display panel according to claim 1, wherein a liquid crystal in the second optical path adjustment portion comprises a first liquid crystal and a second liquid crystal, and the second liquid crystal is obtained by irradiating a photopolymer liquid crystal material with ultraviolet light under a preset electric field, wherein the second liquid crystal is configured to keep a long axis of the first liquid crystal in a preset direction, so that the second optical path adjustment portion is remained in the first state at all times.

10. The display panel according to claim 1, wherein the display panel further comprises a fourth electrode layer arranged on a side of the liquid crystal layer away from the first base substrate and a pixel circuit layer arranged between the light-emitting device layer and the first base substrate, the second driving component comprises a fourth electrode in the fourth electrode layer, and the fourth electrode is electrically connected with a third voltage terminal, wherein the pixel circuit layer comprises a first thin film transistor, a first terminal of the light-emitting device is electrically connected with the first thin film transistor, and a second terminal of the light-emitting device is electrically connected with a fourth voltage terminal; and wherein the second driving component is configured to: generate an electric field in response to a voltage difference between the fourth electrode and the first terminal of the light-emitting device, or generate an electric field in response to a voltage difference between the fourth electrode and the second terminal of the light-emitting device.

11. The display panel according to claim 1, wherein the third liquid crystal comprises at least one of a polymer dispersed liquid crystal or a liquid crystal of an interpenetrating polymer network type.

12. The display panel according to claim1, wherein the display panel further comprises:

a dam layer arranged on the first base substrate, wherein the color conversion layer comprises a plurality of quantum dots of different colors, and the dam layer comprises a dam spacing the plurality of quantum dots from each other; and wherein the second optical path adjustment portion is configured such that the light incident to the second optical path adjustment portion from the first optical path adjustment portion is emitted towards the dam in response to the second optical path adjustment portion being in the first state.

13. The display panel according to claim 12, wherein the display panel further comprises a first driving component arranged on the first base substrate, wherein the second optical path adjustment portion has the first state and a second state, and the second optical path adjustment portion is configured to switch between the first state and the second state in response to an electric field applied by the first driving component; in response to the second optical path adjustment portion being in the first state, a refractive index of the second optical path adjustment portion is less than a refractive index of the first optical path adjustment portion, so that the light incident to the second optical path adjustment portion from the first optical path adjustment portion is refracted; and in response to the second optical path adjustment portion being in the second state, the refractive index of the second optical path adjustment portion is substantially equal to the refractive index of the first optical path adjustment portion; and in response to the second optical path adjustment portion being in the second state, at least part of the light incident to the second optical path adjustment portion from the first optical path adjustment portion is emitted toward at least one of the quantum dots.

14. The display panel according to claim 12, wherein the dam comprises a reflective material, and the display panel further comprises:

a light absorption layer arranged on a side of the dam layer proximate to the first base substrate, wherein the light absorption layer comprises a light absorption portion, and an orthographic projection of the light absorption portion on the first base substrate at least partially overlaps with an orthographic projection of the dam on the first base substrate.

15. The display panel according to claim 14, wherein the light absorption portion comprises a plurality of color resists stacked in a thickness direction of the display panel, wherein different color resists have different colors; or the light absorption portion comprises a black matrix.

16. The display panel according to claim 1, wherein the light-emitting device comprises a micro light-emitting diode.

17. The display panel according to claim 1, wherein the display panel further includes a first alignment layer arranged on a side of the liquid crystal layer proximate to the first base substrate and a second alignment layer arranged on a side of the liquid crystal layer away from the first base substrate; the first alignment layer and the second alignment layer have a same alignment angle; or the liquid crystal in the liquid crystal layer comprises a self-oriented liquid crystal material.

18. The display panel according to claim 1, wherein the display panel further comprises a spacer layer between the color conversion layer and the first base substrate; and the spacer layer comprises a spacer, and an orthographic projection of the spacer on the first base substrate is spaced apart from the orthographic projection of the first optical path adjustment portion on the first base substrate.

19. A display apparatus, comprising a display panel according to claim 1.

* * * * *